United States Patent
Lee et al.

(10) Patent No.: US 10,876,777 B2
(45) Date of Patent: Dec. 29, 2020

(54) AIR CONDITIONING DEVICE USING VAPOR INJECTION CYCLE AND METHOD FOR CONTROLLING THE DEVICE

(71) Applicant: LG Electronics Inc., Seoul (KR)

(72) Inventors: Kang Wook Lee, Seoul (KR); Soojin Kang, Seoul (KR); Hansaem Park, Seoul (KR); Ho Jong Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 16/029,691

(22) Filed: Jul. 9, 2018

(65) Prior Publication Data

US 2019/0011159 A1    Jan. 10, 2019

(30) Foreign Application Priority Data

Jul. 10, 2017 (KR) .................. 10-2017-0087364

(51) Int. Cl.
*F25B 49/02* (2006.01)
*F25B 1/04* (2006.01)
(Continued)

(52) U.S. Cl.
CPC .............. *F25B 49/022* (2013.01); *F25B 1/04* (2013.01); *F25B 1/10* (2013.01); *F25B 40/02* (2013.01); *F25B 40/06* (2013.01); *F25B 49/02* (2013.01); *F25B 2341/0661* (2013.01); *F25B 2500/28* (2013.01); *F25B 2600/0253* (2013.01); *F25B 2600/23* (2013.01); *F25B 2600/2509* (2013.01);
(Continued)

(58) Field of Classification Search
CPC ...... F25B 49/022; F25B 49/02; F25B 31/008; F25B 40/02; F25B 40/06; F25B 2600/0253; F25B 2600/025; F25B 2600/2513; F25B 2700/2115
See application file for complete search history.

(56) References Cited

U.S. PATENT DOCUMENTS

| 2012/0199330 A1* | 8/2012 | Maurer | F25B 39/028 165/168 |
| 2015/0143841 A1* | 5/2015 | Kawano | F25B 13/00 62/498 |

(Continued)

*Primary Examiner* — Brian M King
(74) *Attorney, Agent, or Firm* — Finnegan, Henderson, Farabow, Garrett & Dunner LLP

(57) ABSTRACT

An air conditioning device includes a vapor injection cycle in which an operating speed of a compressor is adjusted to improve efficiency, and a method for controlling the device. The air conditioning device includes an inner heat-exchanger for exchanging heat between a first portion of refrigerant passing through a condenser and a second portion of the refrigerant branched from the first refrigerant, and an injection channel through which the second portion of the refrigerant is injected into the compressor. The inner heat exchanger includes an outer tube and an inner tube disposed inside the outer tube. The first portion of the refrigerant flows into the inner tube, while the second portion of the refrigerant flows into the outer tube. Thus, when a variation of air-conditioning load is small and an injection super-heating temperature is low, the device enables reduction of the compressor rotation speed to ensure high injection super-heating temperature.

4 Claims, 6 Drawing Sheets

(51) Int. Cl.
*F25B 40/02* (2006.01)
*F25B 40/06* (2006.01)
*F25B 1/10* (2006.01)

(52) U.S. Cl.
CPC ............. *F25B 2600/2513* (2013.01); *F25B 2700/2115* (2013.01); *F25B 2700/21151* (2013.01); *F25B 2700/21163* (2013.01)

(56) References Cited

U.S. PATENT DOCUMENTS

2016/0195322 A1* 7/2016 Ko .................... B60H 1/3216
 62/61
2017/0336085 A1* 11/2017 Yasuo ................. F25B 13/00

* cited by examiner

AIR CONDITIONING DEVICE USING VAPOR INJECTION CYCLE AND METHOD FOR CONTROLLING THE DEVICE

CROSS-REFERENCE TO RELATED APPLICATIONS

This application claims the priority of Korean Patent Application No. 10-2017-0087364 filed on Jul. 10, 2017 in the Korean Intellectual Property Office, the disclosure of which is hereby incorporated by reference in its entirety.

BACKGROUND

1. Technical Field

The present disclosure relates to an air conditioning device using a vapor injection cycle in which an operating speed of a compressor is adjusted to improve efficiency, and a method for controlling the device.

2. Description of the Related Art

The air conditioning device uses, in a reversible manner, a transport mechanism of heat circulated in a refrigeration cycle consisting of compression-condensation-expansion-evaporation of refrigerant to perform cooling or heating operation.

The air conditioning device employs a vapor injection compression system that injects gaseous refrigerant into a compressor to improve the cooling or heating capability of the device.

In the vapor injection compression system, a tube between an indoor heat exchanger and an outdoor heat exchanger is branched and then connected to an injection port provided in the compressor. The branched tube is provided with an injection expansion valve to expand the refrigerant and an internal heat exchanger to heat-exchange the expanded refrigerant. This structure is to depressurize and compress branched refrigerant and, then, to heat-exchange the depressurized and compressed refrigerant so that overheated gaseous refrigerant is injected into the compressor.

The vapor injection compression system overcomes a limitation of a refrigerant suction amount, which is otherwise limited by a density of the refrigerant being suctioned into the compressor and a volume of a compression chamber, thereby improving a compression capability of the compressor. This may lead to increasing the amount of circulated refrigerant, thereby improving performance of the cooling or heating operation.

However, in the case of the vapor injection compression systems, when the super-heating temperature of the injected refrigerant is high, this results in compressor super-heating and system efficiency degradation. When the super-heating temperature is low, there is a problem that liquid refrigerant enters the compressor and, thus, overload occurs in the compressor.

SUMMARY

A purpose of the present disclosure is to provide an air conditioner that may improve operating efficiency via a compression cycle using vapor injection.

Another objective of the present disclosure is to provide an air conditioning device control method capable of securing an injection sub-cooling temperature by decelerating a compressor revolution speed even when the injection sub-cooling temperature is not secured with a small variation in air-conditioning load.

The air conditioning device in accordance with the present disclosure includes an inner heat-exchanger for allowing exchanging of heat between first refrigerant passing through a condenser and second refrigerant branched from the first refrigerant, and an injection channel through which the second refrigerant is injected into the compressor. The inner heat exchanger includes an outer tube and an inner tube disposed inside the outer tube. The first refrigerant flows into the inner tube, while the second refrigerant flows into the outer tube. Thus, when variation at air-conditioning load is small and an injection super-heating temperature is low, the device enables reduction of the compressor rotation speed to ensure high injection super-heating temperature.

Further, a method for controlling an air conditioning device including an injection channel may include controlling a rotation speed of the compressor based on an air-conditioning load; controlling an opening rate of the main expansion valve based on a super-heating temperature at an outlet of the condenser; and controlling an opening rate of the injection expansion valve based on a super-heating temperature at an outlet of the injection channel. Further, the method includes, upon detection that a variation in the air-conditioning load is smaller than or equal to a predetermined value, and the super-heating temperature at the outlet of the injection channel is lower than or equal to a predetermined value, reducing a rotation speed of the compressor by a predetermined value.

The air conditioning device according to the present disclosure may use vapor injection to reduce the operating load of the air conditioning device and to ensure a sufficient amount of refrigerant in the condenser. As a result, the cooling/heating performance can be improved.

The method of controlling the air conditioning device according to the present disclosure reduces the rotation speed of the compressor when the change in the air-conditioning load is small and the injection super-heating temperature is low. This leads to higher injection super-heating temperature, and leads to reducing the power consumption and improving the cooling and heating efficiency.

DETAILED DESCRIPTION

Figure 1:
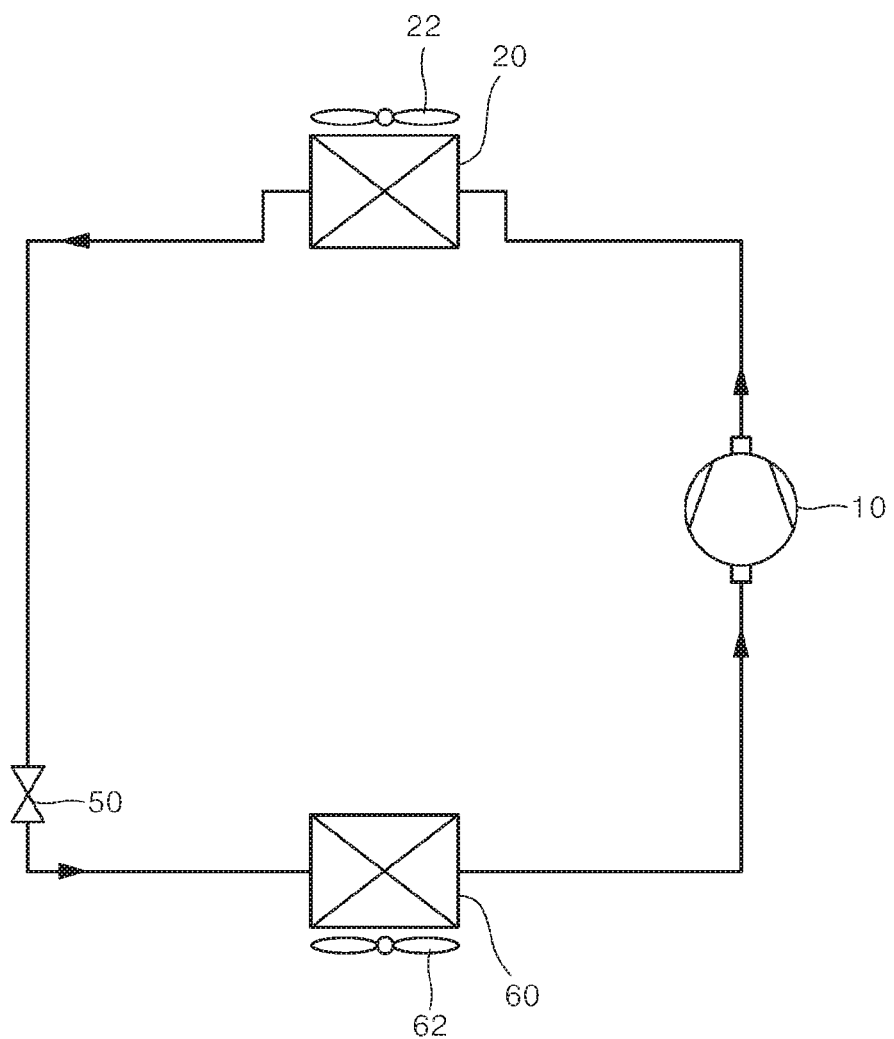
FIG. 1 is a block diagram illustrating an example of a conventional air conditioning device.

The above objects, features and advantages will become apparent from the detailed description with reference to the accompanying drawings. Embodiments are described in sufficient detail to enable those skilled in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
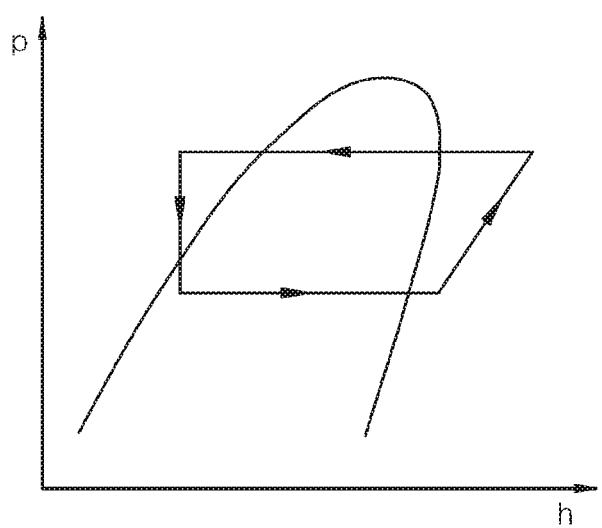
FIG. 2 is a PH diagram showing a state of refrigerant in a typical air-conditioning device.

FIG. 1 is a schematic illustration of a typical air-conditioning device. FIG. 2 is a PH diagram showing a state of refrigerant in a typical air-conditioning device. Referring to FIG. 1, the air-conditioning device includes a compressor 10, a condenser 20, an expansion valve 50, and an evaporator 60. An air-conditioning device with this configuration performs cooling and heating operations.

First, an operation of the air-conditioning device during a heating operation will be described. During the heating operation, the condenser 20 acts as an indoor heat-exchanger, and the evaporator 60 acts as an outdoor heat-exchanger.

During the heating operation, the condenser 20 acts as the indoor heat-exchanger for heat-exchanging indoor air with indoor air to heat the indoor air. The condenser 20 may include a condenser fan 22 capable of improving heat exchange efficiency. Further, the evaporator 60 may include an evaporator fan 62 capable of improving heat exchange efficiency.

The condenser 20 condenses the refrigerant and heats the indoor air by emitting heat. In other words, in the condenser, the refrigerant changes from a gas phase to a liquid state. Thus, condensation heat is released from the condenser.

Compressed high-temperature high-pressure gaseous refrigerant in the compressor 10 is heat-exchanged and condensed in the condenser 20, resulting in high-temperature high-pressure liquid refrigerant.

In the compressor 10, the refrigerant does not change in phase but work is applied to the gaseous refrigerant, such that the temperature and pressure in the refrigerant change.

High-temperature high-pressure gaseous refrigerant which has passed the condenser 20 passes through the expansion valve 50, and, then, the refrigerant becomes low-temperature low-pressure liquid refrigerant.

The expansion valve 50 changes the high-temperature high-pressure gaseous refrigerant to a low-temperature low-pressure refrigerant via wire drawing effect.

The low-temperature low-pressure liquid refrigerant which has passed through the condenser 20 absorbs heat from the evaporator 60 and changes to low-temperature low-pressure gaseous refrigerant. Through the evaporator 60, the refrigerant changes from a liquid state to a gaseous state. In this process, external heat is absorbed.

The low-temperature low-pressure gaseous refrigerant which has passed through the evaporator 60 is compressed in the compressor and converted into high-temperature high-pressure gaseous refrigerant.

During the cooling operation, the condenser 20 serves as an outdoor heat-exchanger, discharging heat outdoors, while the evaporator 60 serves as an indoor heat-exchanger and absorbs indoor heat indoors.

In FIG. 2, a right side of the PH diagram shows the process in the compressor; the upper side of the PH diagram shows the process in the condenser; the left side of the PH diagram shows the process that takes place in the expansion valve; and the lower side of the PH diagram shows the process in the evaporator.

First, the process performed by the compressor 10 will be described. It may be seen that the enthalpy increases with the pressure increase. Due to the operation of the compressor, work is applied to refrigerant, such that low-temperature low-pressure gaseous refrigerant changes to high-temperature high-pressure gaseous refrigerant.

Heat is generated in the condenser 20. Thus, the enthalpy decreases due to the phase change while the pressure is maintained. High-temperature high-pressure gaseous refrigerant is transformed through the condenser 20 into high-temperature high-pressure liquid refrigerant.

In the expansion valve 50, the pressure and the temperature are reduced while the enthalpy is maintained by the wire drawing effect. The high-temperature high-pressure liquid refrigerant is changed through the expansion valve 50 to low-temperature low-pressure liquid refrigerant.

In the evaporator 60, evaporation via endothermic heat is performed. Thus, the enthalpy increases when the pressure is maintained. Thus, low-temperature low-pressure liquid refrigerant is transformed through the evaporator 60 into a low-temperature low-pressure gaseous refrigerant.

The low-temperature low-pressure gaseous refrigerant passing through the evaporator 60 is again sent to the compressor 10. In the compressor, the refrigerant turns into high-temperature high-pressure gaseous refrigerant. In this way, as the refrigerant circulates, heat generation occurs in the condenser 20, while in the evaporator 60, heat absorption occurs.

Next, an air-conditioning device using a vapor injection cycle will be described.

Figure 3:
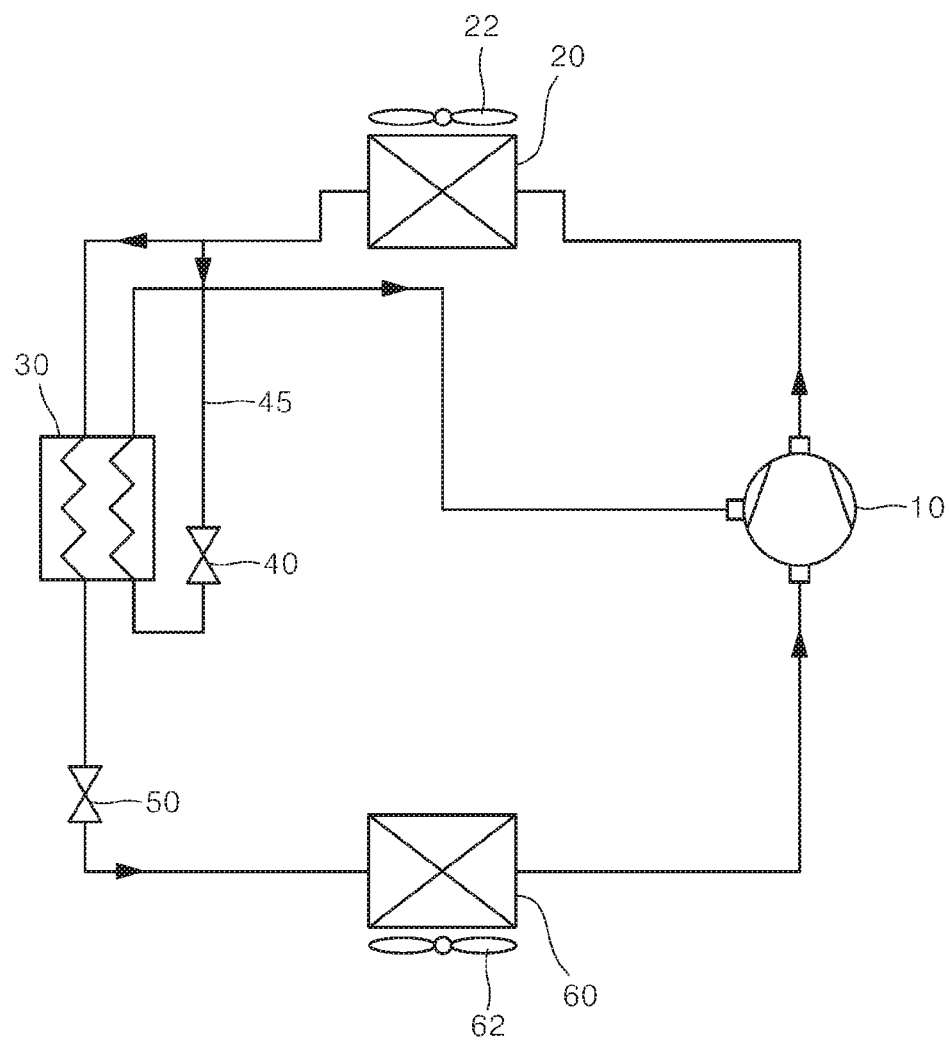
FIG. 3 is a schematic diagram illustrating an air conditioning device using a vapor injection cycle.
Figure 4:
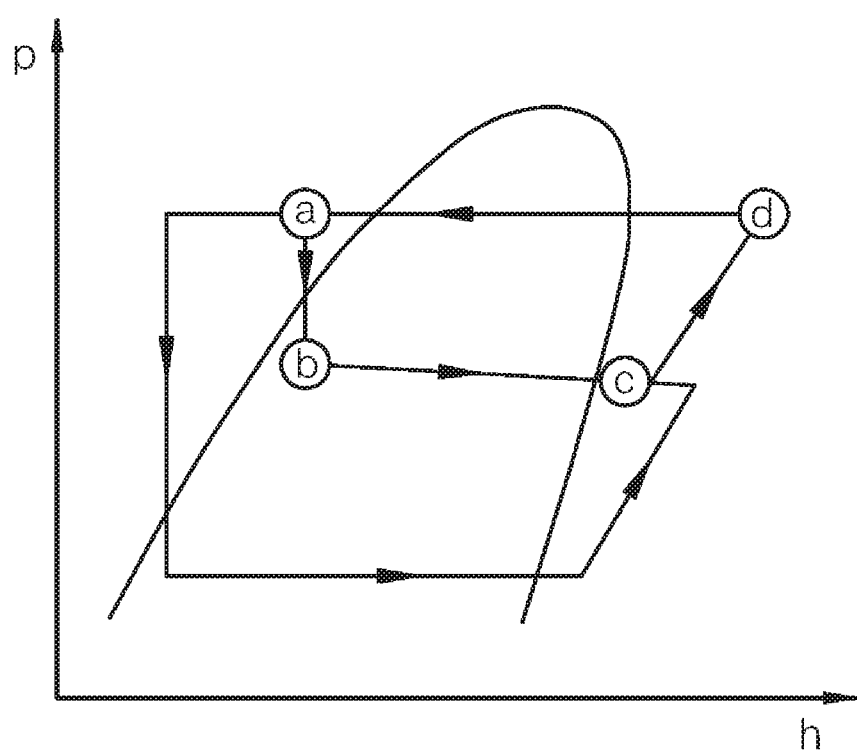
FIG. 4 shows a PH diagram of a refrigerant state of an air conditioning device using a vapor injection cycle.
Figure 5:
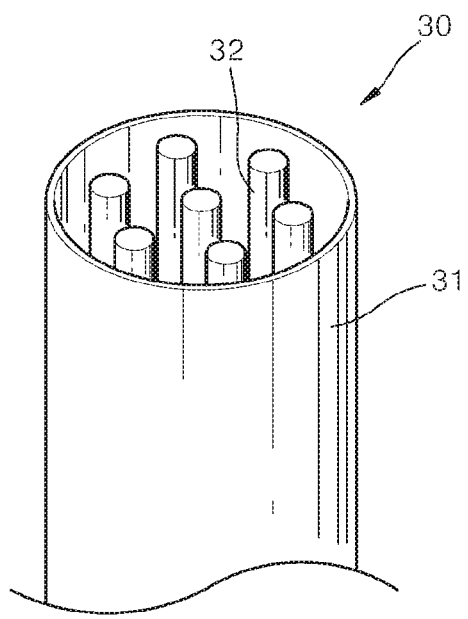
FIG. 5 shows a structure of an inner heat-exchanger of an air conditioning device according to the present disclosure.

FIG. 3 shows a structure of the air-conditioning device using the vapor injection cycle. FIG. 4 shows a PH diagram showing a refrigerant state of the air-conditioning device using the vapor injection cycle. FIG. 5 shows a structure of an inner heat-exchanger of an air conditioning device according to the present disclosure.

Referring to FIG. 3, an air-conditioning device using a vapor injection cycle includes a compressor 10, a condenser 20, a main expansion valve 50, and an evaporator 60. The device further includes an inner heat-exchanger 30 and an injection expansion valve 40.

A portion of the high-temperature high-pressure liquid refrigerant discharged from the condenser 20 is fed to the injection expansion valve 40. Then, the refrigerant passing through the injection expansion valve 40 passes through the inner heat exchanger 30 and is supplied to the compressor 10.

Hereinafter, a refrigerant channel which branches from an outlet of the condenser 20, passes through the injection expansion valve 40 and the inner heat exchanger 30, and then is directed to the compressor 10 is referred to as an injection channel 45.

Further, refrigerant discharged from the condenser 20 is supplied to the inner heat exchanger 30. The refrigerant passing through the condenser 20 and the refrigerant passing through the injection channel 45 branched from the condenser 20 and then passing through the injection expansion valve 40 are heat-exchanged with each other in the inner heat exchanger 30.

FIG. 5 is a cross-sectional view showing the structure of the inner heat-exchanger.

Referring to FIG. 5, the inner heat exchanger 30 includes an outer tube 31 and a plurality of inner tubes 32 provided inside the outer tube 31.

Refrigerant from the rear end of the condenser 20 flows into the inner tubes 32. refrigerant passing through the injection expansion valve 40 flows into between the outer side of the inner tube 32 and the outer tube 31.

In other words, the refrigerant from the rear end of the condenser 20 flows into the inner tube 32. The refrigerant passing through the injection expansion valve 40 flows on the outer sides of the inner tubes 32. As a result, the inner tubes 32 heat-exchange with each other via the refrigerant therebetween.

In this connection, it is preferable that the flow direction of the refrigerant flowing in the inner tube 32 and the flow direction of the refrigerant flowing on the outer side of the inner tube 32 are opposite to each other. As a result, two fluids having different temperatures flow in opposite directions. This allows securing the temperature difference between the two refrigerants, thereby improving the heat exchange efficiency.

The refrigerant from the rear end of the condenser 20 is cooled through the inner heat-exchanger 30 and then flows to the main expansion valve 50. The refrigerant passing through the injection expansion valve 40 flows through the inner heat exchanger 30 in which the refrigerant is vaporized. Then vaporized refrigerant flows to the compressor 10.

By injecting the gas refrigerant into the compressor 10 through the injection channel 45, the load on the air-conditioning device may be reduced even when the operation load of the compressor 10 is large. Further, using the injection channel 45 in the air-conditioning device, the flow amount of refrigerant through compressor 10 and condenser 20 may be secured.

The fact that the flow amount of the refrigerant flowing through the condenser 20 may be secured means that the heating capacity of the indoor unit may be secured during the heating operation.

On the other hand, the ability to secure the flow amount of the refrigerant during the cooling operation, in which the condenser 20 serves as an outdoor heat-exchanger, means that the heat emission capacity of the outdoor unit may be secured.

In one embodiment, via adjusting an opening rate of the injection expansion valve 40, the flow amount of the refrigerant flowing in the injection channel may be controlled. However, the amount of refrigerant as injected may not be controlled in proportion to the opening rate of the injection expansion valve 40 depending on external influences or operating conditions.

Therefore, it is necessary to control the amount of refrigerant to be injected, based on the external influence and the cooling/heating load.

The refrigerant passing through the inner heat exchanger 30 may be expanded through the main expansion valve 50. The expanded refrigerant changes through the evaporator 60 to gaseous refrigerant.

The refrigerant passing through the evaporator 60 flows into the compressor 10. This completes the refrigerant cycle. Before the refrigerant flows into the compressor 10, the refrigerant may pass through an accumulator (not shown).

FIG. 4 shows a PH diagram of a refrigerant cycle including the injection channel.

The refrigerant passing through the compressor 10 passes through condenser 20 at a point d, and then moves to a point a. The refrigerant at the point b passes through the injection channel 45 to a point b. The refrigerant at the point b passes through the injection expansion valve 40, and, then, moves to a point c. The refrigerant entering the point c then flows into the compressor 10 where the refrigerant is again compressed.

As a result, the amount of refrigerant flowing through the condenser 20 may be sufficiently secured. During the heating operation, a flow amount of the refrigerant flowing toward the indoor heat-exchanger may be sufficiently secured. Further, the refrigerant in a high-pressure state may be flowed into the compressor 10, thereby lowering the operating load during the heating operation. Thus, the efficiency of the refrigeration cycle may be improved.

First, a control of the opening rate of the injection expansion valve is described.

The injection expansion valve is controlled by a fuzzy controller (not shown) when the air conditioning device is in a normal operating state. The fuzzy controller may control a typical air conditioning system via an operation frequency calculated using a conventional fuzzy table used in the typical air-conditioning system. In other words, a rotation speed of the compressor may be adjusted by the operation frequency.

The fuzzy controller may adjust an opening rate of the injection expansion valve to maintain an injection super-heating temperature at a specific value. If the super-heating temperature of the refrigerant injected into the compressor is high, this may lead to the super-heating of the compressor 10, and the lowered efficiency of the system. When the super-heating temperature of the injected refrigerant is low, the liquid refrigerant flows into the compressor 10, and, hence, a large load is applied to the compressor 10.

The injection super-heating temperature may preferably be between 3° C. and 7° C.

The air conditioning device may be controlled to maintain the injection super-heating temperature target value within the above range.

The opening rate of the injection expansion valve 40 is finally determined by applying an output of the fuzzy controller and a compensation ratio value. The compensation ratio value may be based on a compensated opening rate based on an opening rate of main expansion valve 50 and based on a current opening rate of the injection expansion valve.

The main expansion valve 50 is provided in the refrigerant channel of the refrigerant flowing through the inner heat-exchanger 30 to the evaporator 60.

The opening rate of the injection expansion valve calculated by the fuzzy controller is compensated based on the opening rate of the main expansion valve.

The opening rate compensation compensates the output of the opening rate of the injection expansion valve in case of disturbance, so that the system may operate stably.

First, a method of compensating the opening rate of the injection expansion valve based on an opening rate of the main expansion valve will be described. First, a compensation ratio based on the opening rate of the main expansion valve is determined.

The compensation ratio may be a value resulting from a division of a difference value between a current opening rate of the main expansion valve and a previous opening rate of the main expansion valve prior to the injection into the air conditioning device, by a difference value between a current opening rate of the main expansion valve and a first flow-confirmation opening rate.

The opening control of the injection expansion valve may be adjusted based on the output of the fuzzy controller. Preferably, the compensation may be performed when the opening rate of the injection expansion valve is decreased by control of the fuzzy controller or when the compensation ratio has a negative value.

The first flow-confirmation opening rate is a predetermined value. When the main expansion valve is set to have the first flow-confirmation opening rate, the flow of the refrigerant may be confirmed through the injection channel 45. Preferably, when the stepping motor is applied, the first flow-confirmation opening rate may be 30 pulses to 50 pulses.

Thus, the main expansion valve compensation ratio may be expressed as:

> Compensation ratio for main expansion valve=(current opening rate of main expansion valve−previous opening rate of main expansion valve prior to injection)/(current opening rate of main expansion valve−first flow-confirmation opening rate).

Based on the compensation ratio of the main expansion valve, the opening rate of the injection expansion valve may be compensated. More specifically, a value obtained by multiplying the main expansion valve compensation ratio by the opening rate variation of the injection expansion valve as determined by the fuzzy controller may be used to adjust the opening rate of the injection expansion valve.

The value obtained via multiplying the main expansion valve compensation ratio by the opening rate variation of the injection expansion valve as determined by the fuzzy controller may be referred to as the main expansion valve compensated opening rate.

Compensating for the opening rate of the main expansion valve in this way may be executed for a following purpose: when the current opening rate of the main expansion valve is greater than the previous opening rate thereof before injection, the amount of refrigerant flowing through the main expansion valve is increased. When considered in connection with the opening rate of the injection expansion valve, the main expansion valve compensated opening rate may be added to the injection expansion valve opening rate.

Further, the injection expansion valve opening rate may be compensated based on a current injection expansion valve opening rate. The injection expansion valve opening rate may be a value obtained by dividing a current opening rate of the injection expansion valve by a second flow-confirmation opening rate.

The second flow-confirmation opening rate is an opening rate of the injection expansion valve when the flow of refrigerant into the injection channel 45 starts. The second flow-confirmation opening rate may be a predetermined value. The second flow-confirmation opening rate is measured when the refrigerant flows in the injection channel 45. The second flow-confirmation opening rate measurement may be stored and utilized.

When the opening rate of the injection expansion valve is a predetermined value, the predetermined value may be 30 pulses to 50 pulses.

Compensating the injection expansion valve opening rate based on the second flow-confirmation opening rate of the injection expansion valve opening rate may be performed when the current opening rate of the injection expansion valve is equal to or larger than a specific value and the output value by the fuzzy controller can decrease the opening rate of the injection expansion valve.

Therefore, controlling the opening rate of the injection expansion valve may be based on the output value of the fuzzy controller, the opening rate of the main expansion valve, and the opening rate of the injection expansion valve.

A resulting opening rate of the injection expansion valve as compensated based on the values may be a value obtained as follows:

> Resulting opening rate=(output value of the fuzzy controller×opening rate of the injection expansion valve)+(compensated opening rate of the main expansion valve).

The resulting output value of the injection expansion valve is determined using the compensated values. The injection is executed using the resulting output value. Then, the injection super-heating temperature is measured. Then, a next control period is determined based on the measured temperature. In the next control period, the injection expansion valve is controlled.

Controlling the injection expansion valve in this way may allow the injection super-heating temperature to be kept at the target value. As a result, the injection efficiency is increased. Thus, the load of the compressor 10 is reduced, and sufficient amount of refrigerant is secured in operation.

Figure 6:
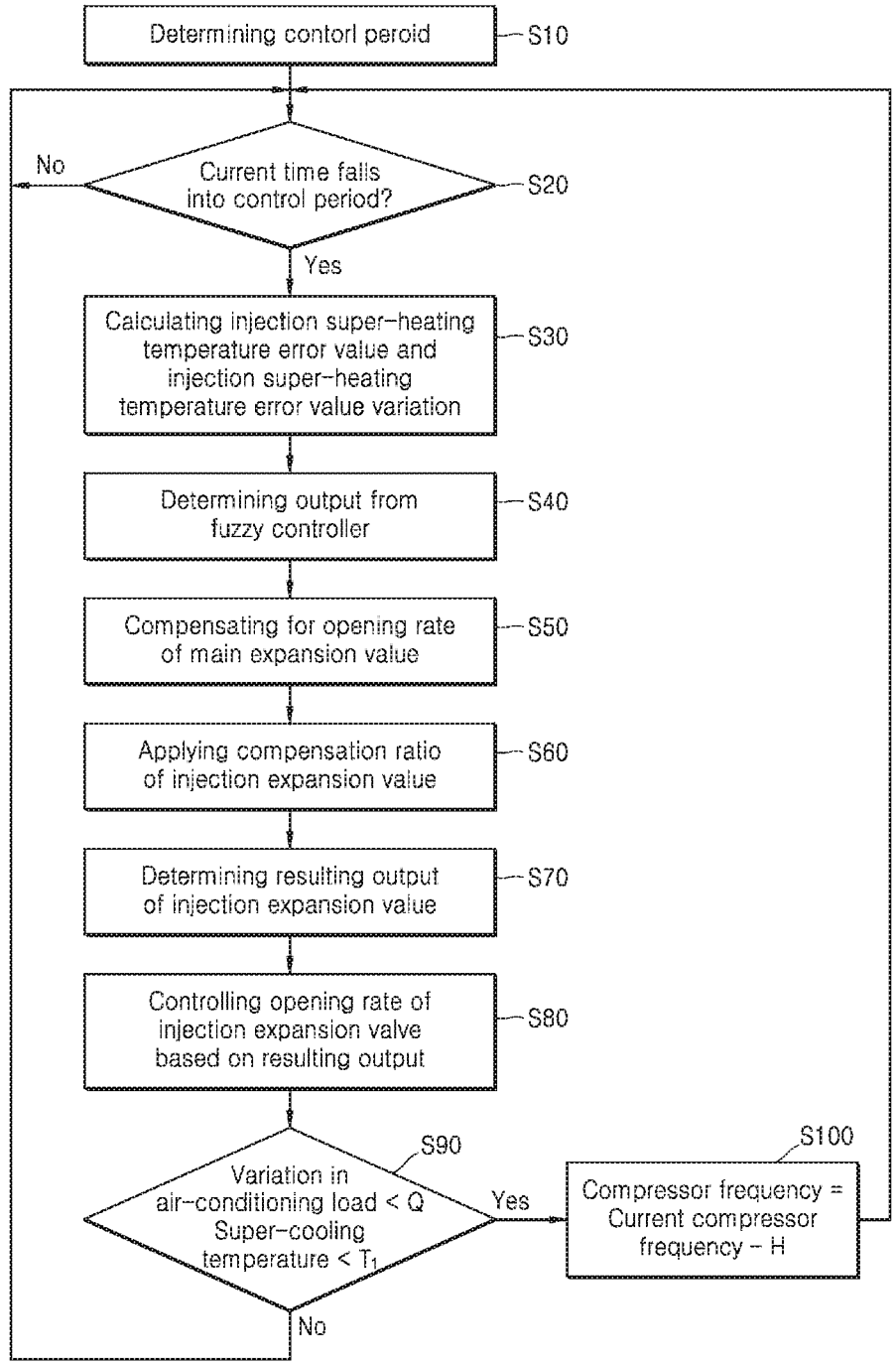
FIG. 6 is a flowchart showing a method for controlling an operation of an air conditioning device using a vapor injection cycle according to the present disclosure.

FIG. 6 is a flowchart showing a method to control the operation of the air-conditioning device using the vapor injection cycle according to the present disclosure.

Referring to FIG. 6, a method for controlling an air conditioning device according to an embodiment of the present disclosure may begin at a control period determination operation S10.

In the control period determination operation S10, a time interval for performing the control is set.

In this connection, the control period may be determined based on the injection super-heating temperature value. For example, if the injection super-heating temperature is higher than the target value, control is performed every first control period. If the injection super-heating temperature is lower than the target value, control is performed every second control period.

In this connection, the first control period may be 20 to 40 seconds, while the second control period may be 5 to 20 seconds.

At the initial start, control is performed according to a control period set by the user. Alternatively, the second control period may be set as a control period.

If the control period is set, it is checked whether or not a current time falls within the control period as set (S20). When the current time falls within the control period, a subsequent control operation is performed.

The opening rate of the injection expansion valve is based on the injection super-heating temperature.

To this end, operation S30 may be performed to calculate an injection super-heating temperature error value and an injection super-heating temperature error value variation.

The injection super-heating temperature error value is a value obtained by subtracting the injection super-heating temperature target value from the injection super-heating temperature value in one embodiment.

Preferably, the injection super-heating temperature target value may be between 3° C. and 7° C. In order to reduce the injection super-heating temperature error value to zero, the air conditioning device may control the injection expansion valve opening rate.

The injection super-heating temperature error value variation may be a difference between the injection error value in the previous control period and the injection error value in the current control period. The stability of the air conditioning device system may be determined based on the injection super-heating temperature error value variation.

The method then includes operation S40, which determines the output of the fuzzy controller (not shown). The output of the fuzzy controller may be determined based on the fuzzy table. When the injection expansion valve opening rate is intended to be increased, the rate may be increased by a first fuzzy control value. When the injection expansion valve opening rate in intended to be decreased, the rate may be reduced by a second fuzzy control value. An absolute value of the first fuzzy control value may be smaller than an absolute value of the second fuzzy control value.

Next, the method performs operation S50 to determine a main expansion valve opening compensated value. The main expansion valve opening compensated value may be a product between the main expansion valve compensation ratio and the injection expansion valve opening rate variation.

The main expansion valve opening compensated value may be a value obtained by multiplying the main expansion valve compensation ratio by the injection expansion valve opening rate variation. The injection expansion valve opening rate variation may be a value obtained by dividing a current opening rate of the injection expansion valve by the flow-confirmation opening rate of the injection expansion valve.

The flow-confirmation opening rate of the injection expansion valve may be a predetermined value. Alternatively, the flow-confirmation opening rate may be the opening rate of the injection expansion valve measured when the refrigerant begins to flow into the injection channel 45.

Next, the method may include operation S60 for determining an injection expansion valve compensation ratio value.

The compensation ratio of the injection expansion valve may be a value obtained by dividing a current opening rate of the injection expansion valve by a flow-confirmation opening rate of the injection expansion valve.

Preferably, only when the current opening rate of the injection expansion valve is above a specific value, and when the injection expansion valve control by the fuzzy controller (not shown) reduces the opening rate of the injection expansion valve, the compensation based on the injection expansion valve compensation ratio may be applied. Preferably, when the current opening rate of the injection expansion valve is 80 pulses or higher, the opening rate of the injection expansion valve may be compensated based on the injection expansion valve compensation ratio.

Next, the method may include an operation S70 to determine the resulting injection expansion valve opening rate.

The final compensated opening rate of the injection expansion valve may be calculated as follows:

Final compensated opening rate=(an output value of the fuzzy controller+the main expansion valve opening compensated value)×(the injection expansion valve compensation ratio).

Preferably, compensating the opening rate of the injection expansion valve may be performed to reduce the opening rate of the injection expansion valve.

In this way, the opening rate of the main expansion valve and the opening rate of the injection expansion valve are controlled (S80). Additionally, when the air-conditioning load variation is small and the sub-cooling temperature at the injection outlet is not secured, the method may include an operation of reducing the rotation speed of the compressor.

To this end, the method includes an operation S90 for determining whether the air-conditioning load variation and the injection sub-cooling temperature are below a certain value, and an operation S100 for decreasing a current compressor frequency by a constant value.

When the variation of the air-conditioning load is not large, and when the injection sub-cooling temperature is lower than the target value, the set compressor frequency may be reduced by a constant value H. Reducing the rotation speed of the compressor may reduce the flow amount of refrigerant discharged from the compressor, thereby securing the sub-cooling temperature. The rotation speed is adjusted based on the frequency applied to the compressor. Therefore, the frequency applied to the compressor may be reduced to reduce the rotation speed of the compressor. For example, when the maximum rotation speed of the compressor is 2500 rpm, the rotation speed of the compressor may be gradually reduced by 50 rpm.

If the condition at the S90 operation is satisfied, the rotation speed of the compressor is reduced to 2450 rpm. In this state, if the condition at the operation S90 is satisfied again, the rotation speed of the compressor is reduced to 2400 rpm. Whenever the condition at the S90 operation is met, the rotation speed of the compressor is further reduced correspondingly. The compressor rotation speed reduction is performed until the sub-cooling temperature of the injection refrigerant channel is secured.

In this way, the injection sub-cooling temperature may be increased while the target high-pressure and the target discharge super-heating temperature corresponding to the air-conditioning load are met.

In one embodiment, when the air-conditioning load during operation exceeds a predetermined value set in the S90 operation, a new compressor rotation speed (frequency) is set correspondingly, and subsequent control procedures are performed accordingly.

The detailed advantageous effects according to the present disclosure as well as the aforementioned effect have been described above with regard to the embodiments of the present disclosure. The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. An air conditioning device for use in performing a refrigeration cycle, the device comprising:
   a compressor for compressing a refrigerant;
   a condenser for condensing the refrigerant from the compressor;
   an inner heat-exchanger for exchanging heat between a first portion of the refrigerant passing through the condenser and a second portion of the refrigerant branched from the first portion of the refrigerant;
   an injection channel through which the second portion of the refrigerant is injected into the compressor;
   a main expansion valve for regulating flow of the first portion of the refrigerant coming from the inner heat-exchanger;
   an injection expansion valve for controlling flow of the second portion of the refrigerant introduced into the inner heat-exchanger; and
   a controller configured for adjusting a rotation speed of the compressor, an opening rate of the main expansion valve, and an opening rate of the injection expansion valve,
   wherein the inner heat exchanger includes an outer tube and a plurality of inner tubes disposed inside the outer tube,
   wherein the first portion of the refrigerant flows into the inner tubes, while the second portion of the refrigerant flows between the outer tube and the inner tubes, and
   wherein the controller is configured for:
      measuring an air-conditioning load variation and a sub-cooling temperature of the first portion of the refrigerant flowing into the main expansion valve; and
      when the air-conditioning load variation is smaller than or equal to a predetermined value, and when the sub-cooling temperature of the first portion of the refrigerant is lower than or equal to a predetermined value, decreasing a current compressor frequency by a constant value.

2. The air conditioning device of claim 1, wherein a flow direction of the first portion of the refrigerant and a flow direction of the second portion of the refrigerant are opposite to each other.

3. The air conditioning device of claim 1, further comprising:
  a temperature sensor for measuring a temperature of the second portion of the refrigerant supplied through the injection channel to the compressor,
  wherein the controller is configured for:
    controlling a rotation speed of the compressor based on the air-conditioning load variation; and
    reducing the rotation speed of the compressor when a temperature value from the temperature sensor is lower than or equal to a first predetermined value and the air-conditioning load variation is smaller than or equal to a second predetermined value.

4. The air conditioning device of claim 1,
  wherein the second portion of the refrigerant supplied through the injection channel is pressurized from an intermediate pressure to a high pressure by the compressor.

* * * * *